United States Patent
Seo et al.

(10) Patent No.: US 11,176,457 B2
(45) Date of Patent: Nov. 16, 2021

(54) METHOD AND APPARATUS FOR RECONSTRUCTING 3D MICROSTRUCTURE USING NEURAL NETWORK

(71) Applicant: SAMSUNG ELECTRONICS CO., LTD., Suwon-si (KR)

(72) Inventors: Seungwoo Seo, Suwon-si (KR); Kyongmin Min, Suwon-si (KR); Eunseog Cho, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 249 days.

(21) Appl. No.: 16/593,573

(22) Filed: Oct. 4, 2019

(65) Prior Publication Data
US 2020/0134465 A1    Apr. 30, 2020

(30) Foreign Application Priority Data

Oct. 29, 2018   (KR) .................. 10-2018-0130242

(51) Int. Cl.
*G06N 3/08* (2006.01)
*G06T 17/00* (2006.01)
(Continued)

(52) U.S. Cl.
CPC ............ *G06N 3/084* (2013.01); *G06F 17/15* (2013.01); *G06F 17/16* (2013.01); *G06T 17/00* (2013.01); *G06T 19/20* (2013.01)

(58) Field of Classification Search
CPC ......... G06N 3/084; G06F 17/15; G06F 17/16; G06T 17/00; G06T 19/20
See application file for complete search history.

(56) References Cited

U.S. PATENT DOCUMENTS

2017/0103161 A1    4/2017   Brubaker et al.
2018/0144463 A1    5/2018   Wang
(Continued)

OTHER PUBLICATIONS

Ahmet Cecen, Hanjun Dai, Yuksel C. Yabansu, Surya R. Kalidindi, Le Song, Material structure-property linkages using three-dimensional convolutional neural networks, Acta Materialia, vol. 146, 2018, pp. 76-84, ISSN 1359-6454, https://doi.org/10.1016/j.actamat.2017.11.053. (Year: 2018).*

(Continued)

*Primary Examiner* — Fayyaz Alam
(74) *Attorney, Agent, or Firm* — Sughrue Mion, PLLC

(57) ABSTRACT

A method of generating a 3D microstructure using a neural network includes configuring an initial 3D microstructure; obtaining a plurality of cross-sectional images by disassembling the initial 3D microstructure in at least one direction of the initial 3D microstructure; obtaining first output feature maps with respect to at least one layer that constitutes the neural network by inputting each of the cross-sectional images to the neural network; obtaining second output feature maps with respect to at least one layer by inputting a 2D original image to the neural network; generating a 3D gradient by applying a loss value to a back-propagation algorithm after calculating the loss value by comparing the first output feature maps with the second output feature maps; and generating a final 3D microstructure based on the 2D original image by reflecting the 3D gradient to the initial 3D microstructure.

17 Claims, 9 Drawing Sheets

(51) Int. Cl.
*G06F 17/15* (2006.01)
*G06F 17/16* (2006.01)
*G06T 19/20* (2011.01)

(56) References Cited

U.S. PATENT DOCUMENTS

2019/0362522 A1* 11/2019 Han ............... A61B 5/7267
2020/0065940 A1* 2/2020 Tang ............... G06N 20/00
2020/0272131 A1* 8/2020 Wang ............ G05B 19/4099

OTHER PUBLICATIONS

Cang, Ruijin, et al. "Improving direct physical properties prediction of heterogeneous materials from imaging data via convolutional neural network and a morphology-aware generative model." Computational Materials Science 150 (2018): 212-221. (Year: 2018).*

Veeraraghavan Sundararaghavan et al. "Classification and reconstruction of three-dimensional microstructures using support vector machines" Computational Materials Science, vol. 32, 2005, (pp. 223-239).

Ramin Bostanabad et al. "Stochastic microstructure characterization and reconstruction via supervised learning" Acta Materialia, vol. 103, 2016, (pp. 89-102).

Z. Jiang et al. "Efficient 3D porous microstructure reconstruction via Gaussian random field and hybrid optimization" Journal of Microscopy, 2013, (14 pages total).

C. L. Y. Yeong et al. "Reconstructing random media. II. Three-dimensional media from two-dimensional cuts" Physical Review E, vol. 58, No. 1, Jul. 1998, (10 pages total).

R. Bostanabad et al. "Characterization and reconstruction of 3D stochastic microstructures via supervised learning" Journal of Microscopy, vol. 0, Issue 0, 2016, (pp. 1-16).

Yanghao Li et al. "Demystifying Neural Style Transfer" Proceedings of the Twenty-Sixth International Joint Conference on Artificial Intelligence (IJCAI-17), 2017, (7 pages total).

Mingliang Gao et al. "Pattern density function for reconstruction of three-dimensional porous media from a single two-dimensional image" Physical Review E, vol. 93, 2016, (12 pages total).

* cited by examiner

METHOD AND APPARATUS FOR RECONSTRUCTING 3D MICROSTRUCTURE USING NEURAL NETWORK

CROSS-REFERENCE TO RELATED APPLICATION

This application is based on and claims priority from Korean Patent Application No. 10-2018-0130242, filed on Oct. 29, 2018, in the Korean Intellectual Property Office, the disclosure of which is incorporated herein in its entirety by reference.

BACKGROUND

1. Field

The disclosure relates to methods and apparatuses for reconstructing a three-dimensional (3D) microstructure using a neural network, and more particularly, to methods and apparatuses for reconstructing a 3D microstructure from a two-dimensional (2D) original image using a convolution neural network.

2. Description of the Related Art

Recently, many studies have been conducted related to design and discovery of new material. In order to detect an interrelation of structure-characteristic of a new material or physical properties of the new material that may not be observable on a 2D image of a material, there is need to obtain a 3D structure of the material.

However, when many cross-sections of the new material are needed to obtain a 3D structure, excessive energy consumption and loss of image quality may occur.

Also, in the related art, a method of reconstructing a 3D microstructure of the material is based on a probability determination, but does not use convolution neural network. Therefore, there have been problems with accuracy due to the difference between a shape of particles that constitute generated 3D microstructure and that of a 2D original image.

SUMMARY

Provided are methods and apparatuses for generating a 3D microstructure using a neural network.

Additional aspects will be set forth in part in the description which follows and, in part, will be apparent from the description, or may be learned by practice of the presented embodiments.

According to an aspect of the disclosure, there is provided a method of generating a 3D microstructure using a neural network, the method comprising: configuring an initial 3D microstructure; obtaining a plurality of cross-sectional images by disassembling the initial 3D microstructure in at least one direction of the initial 3D microstructure; generating first output feature maps with respect to at least one layer of the neural network based on each of the cross-sectional images to the neural network; generating second output feature maps with respect to at least the one layer in the neural network based on a 2D original image; generating a 3D gradient by applying a loss value based on the first output feature maps and the second output feature maps to a back-propagation algorithm in the neural network; and generating a final 3D microstructure by modifying the initial 3D microstructure based on the 3D gradient.

The generating of the 3D gradient may comprise: generating 2D gradients respectively corresponding to each of the plurality of cross-sectional images by applying the loss value to the back-propagation algorithm, the loss value being calculated by comparing the first output feature maps with the second output feature maps.

The at least one direction may comprise one of a first direction parallel to an xy plane, a second direction parallel to a yz plane, or a third direction parallel to an xz plane of the initial 3D microstructure, and the plurality of cross-sectional images may comprise a plurality of first cross-sectional images obtained by disassembling the initial 3D microstructure in the first direction parallel to the xy plane, a plurality of second cross-sectional images obtained by disassembling the initial 3D microstructure in the second direction parallel to the yz plane, and a plurality of third cross-sectional images obtained by disassembling the initial 3D microstructure in the third direction parallel to the xz plane.

The generating of the 3D gradient may comprise: generating 2D gradients respectively corresponding to each of the plurality of cross-sectional images by applying the loss value to the back-propagation algorithm; generating a first 3D gradient from the 2D gradients respectively corresponding to the plurality of first cross-sectional images; generating a second 3D gradient from the 2D gradients respectively corresponding to the plurality of second cross-sectional images; generating a third 3D gradient from the 2D gradients respectively corresponding to the plurality of third cross-sectional images; and generating a final 3D gradient by adding the first 3D gradient, the second 3D gradient, and the third 3D gradient.

The initial 3D microstructure may have a pixel size of a×b×c (a, b, and c respectively are natural numbers), the total number of the first cross-sectional images, the second cross-sectional images, and the third cross-sectional images is a+b+c.

The generating of the final 3D microstructure may comprise: generating an intermediate 3D microstructure by modifying the initial 3D microstructure based on the 3D gradient; generating a new 3D gradient based on the intermediate 3D microstructure when the loss value is greater than a predetermined value and modifying the intermediate 3D microstructure based on the new 3D gradient; and determining the intermediate 3D microstructure as the final 3D microstructure when the loss value is less than the predetermined value.

The generating of the 3D gradient may comprise: obtaining a first gram matrix using the first output feature maps respectively output from at least one layer; and obtaining a second gram matrix using the second output feature maps respectively output from at least one layer, wherein the loss value is calculated by comparing the first gram matrix with the second gram matrix.

The neural network may comprise a convolution neural network (CNN).

According to another aspect of the disclosure, there is provided a non-transitory computer-readable recording medium comprising a computer-readable program for executing a method of generating a 3D microstructure using a neural network, the method comprising: configuring an initial 3D microstructure; obtaining a plurality of cross-sectional images by disassembling the initial 3D microstructure in at least one direction of the initial 3D microstructure; generating first output feature maps with respect to at least one layer of the neural network based on each of the cross-sectional images to the neural network; generating second output feature maps with respect to at least the one layer in the neural network based on a 2D original image; generating a 3D gradient by applying a loss value based on the first output feature maps and the second output feature maps to a back-propagation algorithm in the neural network; and generating a final 3D microstructure by modifying the initial 3D microstructure based on the 3D gradient.

According to another aspect of the disclosure, there is provided an apparatus configured to generate a 3D microstructure using a neural network, the apparatus comprising: a memory configured to store at least one program; and at least one processor configured to process data in the neural network by executing the at least one program, wherein the at least one processor is configured to: configure an initial 3D microstructure; obtain a plurality of cross-sectional images by disassembling the initial 3D microstructure in at least a direction; generate first output feature maps with respect to at least one layer of the neural network based on each of the cross-sectional images to the neural network; generate second output feature maps with respect to the at least one layer in the neural network based on a 2D original image; generate a 3D gradient by applying a loss value based on the first output feature maps with the second output feature maps to a back-propagation algorithm in the neural network; and generate a final 3D microstructure by modifying the initial 3D microstructure based on the 3D gradient.

The at least one processor may generate 2D gradients respectively corresponding to each of the plurality of cross-sectional images by applying the loss value to the back-propagation algorithm, the loss value being calculated by comparing the first output feature maps with the second output feature maps; and generate the 3D gradient by stacking the 2D gradients.

The at least one direction may comprise one of a first direction parallel to an xy plane, a second direction parallel to a yz plane, or a third direction parallel to an xz plane of the initial 3D microstructure, and the plurality of cross-sectional images comprises a plurality of first cross-sectional images obtained by disassembling the initial 3D microstructure in the first direction parallel to the xy plane, a plurality of second cross-sectional images obtained by disassembling the initial 3D microstructure in the second direction parallel to the yz plane, and a plurality of third cross-sectional images obtained by disassembling the initial 3D microstructure in the third direction parallel to the xz plane.

The at least one processor may be further configured to: generate 2D gradients respectively corresponding to each of the plurality of cross-sectional images by applying the loss value to the back-propagation algorithm; generate a first 3D gradient from 2D gradients respectively corresponding to the first cross-sectional images; generate a second 3D gradient from the 2D gradients respectively corresponding to the second cross-sectional images; generates a third 3D gradient from the 2D gradients respectively corresponding to the third cross-sectional images; and generate a final 3D gradient by adding the first 3D gradient, the second 3D gradient, and the third 3D gradient.

The initial 3D microstructure may have a pixel size of a×b×c (a, b, and c respectively are natural numbers), the total number of first cross-sectional images, second cross-sectional images, and third cross-sectional images is a+b+c.

The at least one processor may be further configured to: generate an intermediate 3D microstructure by modifying the initial 3D microstructure based on the 3D gradient; generate a new 3D gradient based on the intermediate 3D microstructure when the loss value is greater than a predetermined value and modifies the intermediate 3D microstructure based on the new 3D gradient, and determine the intermediate 3D microstructure as the final 3D microstructure when the loss value is less than the predetermined value.

The at least one processor may be further configured to: obtain a first gram matrix using the first output feature maps respectively output from at least one layer; and obtain a second gram matrix using the second output feature maps respectively output from at least one layer, wherein the loss value is calculated by comparing the first gram matrix with the second gram matrix.

The neural network may comprise a convolution neural network (CNN).

According to another aspect of the disclosure, there is provided an apparatus configured to generate a 3D microstructure of material using a neural network, the apparatus comprising: a memory configured to store at least one program; and at least one processor configured to process data in the neural network by executing the at least one program, wherein the at least one processor is configured to: receive a first 3D microstructure image; obtain a plurality of cross-sectional images from the first 3D microstructure; generates a plurality of first output feature map information with respect to at least one layer of the neural network based on the plurality of cross-sectional images, each of the plurality of first output features map information uniquely corresponding to one of the plurality of cross-sectional images; receives a 2D original surface image of the material; generates a second output feature map information with respect to at least one layer of the neural network based on the 2D original surface image; generates a 3D gradient by comparing each of the plurality of first output feature map information with the second output feature map information; and generates a second 3D microstructure based on the generated 3D gradient.

In generating the 3D gradient, the at least one processor may be further configured to: calculate a plurality of loss values based on results of the comparing each of the plurality of first output feature map information with the second output feature map information; generate a plurality of 2D gradients corresponding to each of the plurality of cross-sectional images by applying the plurality of loss values to a back-propagation algorithm in the neural network; and stack the plurality of 2D gradients to generate the 3D gradient.

The 2D original surface image may be an image captured by an image capturing device.

According to another aspect of the disclosure, there is provided a method of generating a 3D microstructure of a material using a neural network, the method comprising: receiving a first 3D microstructure image; obtaining a plurality of cross-sectional images from the first 3D microstructure; generating a plurality of first output feature map information with respect to at least one layer of the neural network based on the plurality of cross-sectional images, each of the plurality of first output features map information uniquely corresponding to one of the plurality of cross-sectional images; receiving a 2D original surface image of the material; generating a second output feature map information with respect to at least one layer of the neural network based on the 2D original surface image; generating a 3D gradient by comparing each of the plurality of first output feature map information with the second output feature map information; and generating a second 3D microstructure based on the generated 3D gradient.

The generating the 3D gradient may comprise: calculating a plurality of loss values based on results of the comparing each of the plurality of first output feature map information with the second output feature map information; generating a plurality of 2D gradients corresponding to each of the plurality of cross-sectional images by applying the plurality of loss values to a back-propagation algorithm in the neural network; and stacking the plurality of 2D gradients to generate the 3D gradient.

The 2D original surface image may be an image captured by an image capturing device.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Terminologies used herein are selected as commonly used by those of ordinary skill in the art in consideration of functions of the current embodiment, but may vary according to the technical intention, precedents, or a disclosure of a new technology. Also, in particular cases, some terms are arbitrarily selected by the applicant, and in this case, the meanings of the terms will be described in detail at corresponding parts of the specification. Accordingly, the terms used in the specification should be defined not by simply the names of the terms but based on the meaning and contents of the whole specification.

In the descriptions of the embodiments, it will be understood that, when an element is referred to as being connected to another element, it may include electrically connected when the element is directly connected to the other element and when the element is indirectly connected to the other element by intervening a constituent element. Also, it should be understood that, when a part "comprises" or "includes" a constituent element in the specification, unless otherwise defined, it is not excluding other elements but may further include other elements.

It will be further understood that the term "comprises" or "includes" should not be construed as necessarily including various constituent elements and various operations described in the specification, and also should not be construed that portions of the constituent elements or operations of the various constituent elements and various operations may not be included or additional constituent elements and operations may further be included.

The descriptions of the embodiments should not be interpreted as limiting the scope of right, and embodiments that are readily inferred from the detailed descriptions and embodiments by those of ordinary skill in the art will be construed as being included in the inventive concept. Hereinafter, references will now be made in detail to embodiments, examples of which are illustrated in the accompanying drawings.

Figure 1:
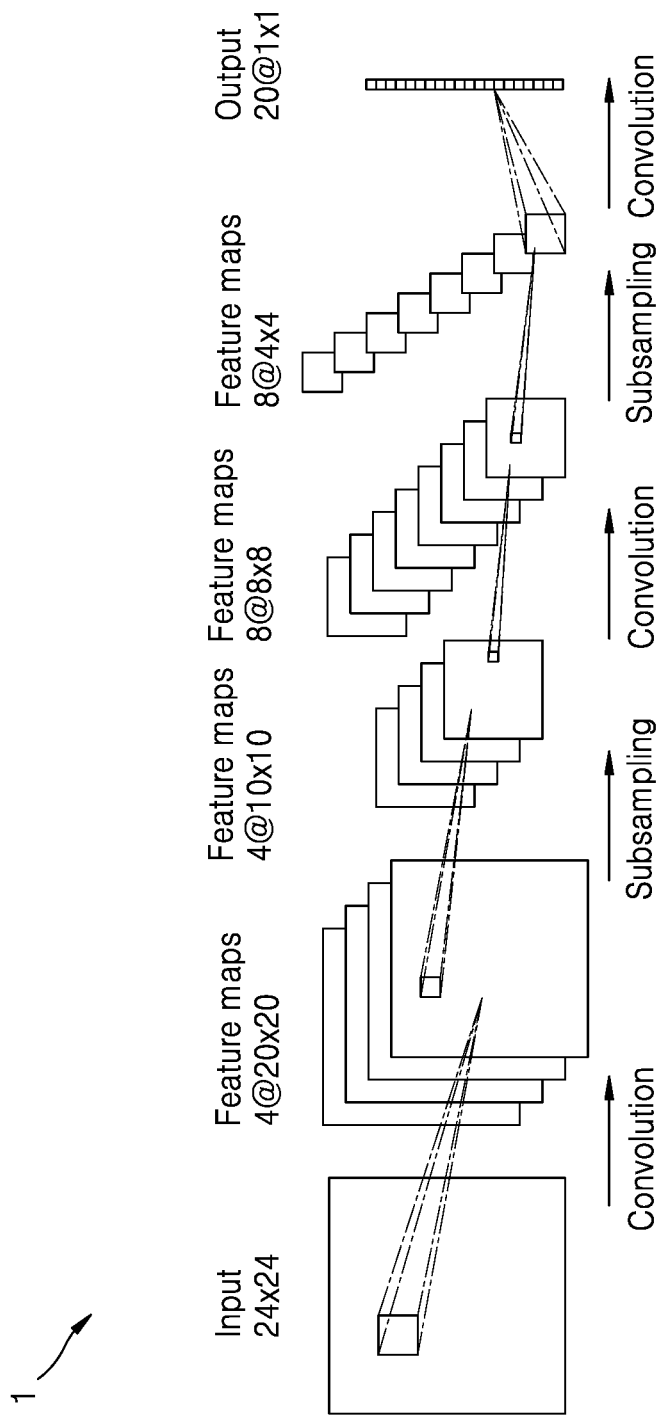
FIG. 1 is a diagram for explaining an example of a neural network architecture.

FIG. 1 is a diagram for explaining an example of a neural network 1 architecture according to an embodiment.

A neural network refers to a class of models that may be used to solve problems by adjusting the binding strength of synapses through learning.

Referring to FIG. 1, the neural network 1 may be an architecture of a deep neural network (DNN) or an N-layer neural network. The DNN or the N-layer neural network may correspond to convolutional neural networks (CNN), recurrent neural networks (RNN), deep belief networks, restricted Boltzmann machines, etc. For example, the neural network 1 may be realized as the CNN. In FIG. 1, in the convolution neural network corresponding to an example of the neural network 1, a subsampling layer (or a pooling layer), and a fully connected layer may further be included besides the convolution layer.

The neural network 1 may be realized as an architecture having a plurality of layers including an input image, feature maps, and an output. In the neural network 1, the input image performs a convolution computation with a filter referred to as a kernel, and feature maps are output as a result. The output feature maps generated at this process are input feature maps, and the input feature maps re-perform a convolution computation with a kernel, and, as a result, new feature maps are output. In this way, as a result of repeatedly performing the convolution computations, a recognition result with respect to characteristics of input image may be finally output through the neural network 1.

For example, when an image having a size of 24×24 is input to the neural network 1, the input image may be output as four channel feature maps having a size of 20×20 through convolution computations with a kernel. Also, four channel feature maps having a size of 10×10 may be output by using some of the pixel values of the four channel feature maps having a size of 20×20 through a sub-sampling. The sub-sampling method may include a max-pooling method, an average-pooling method, etc.

Thereafter, a size of the feature maps having a size of 10×10 is reduced through repeated convolution computation and sub-sampling computation with a kernel, and finally, global characteristics of the input image is output. The neural network 1 may filter and output touch characteristics that may represent the whole image from an input image by repeatedly performing the convolution computation and the sub-sampling computation with the kernel and may draw a recognition result with respect to a final input image by inputting the output global characteristics to a fully connected layer.

Figure 2:
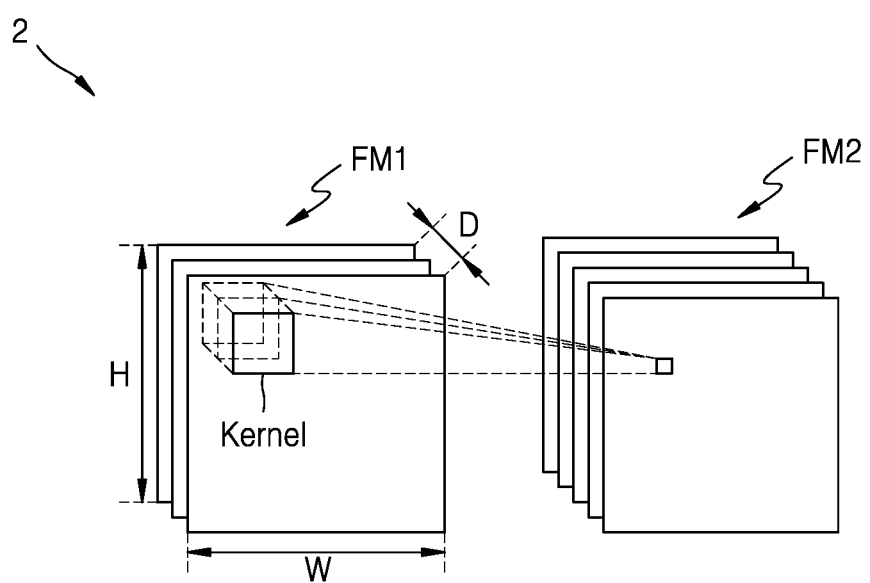
FIG. 2 is a diagram for explaining a relationship of an input feature map and an output feature map in a neural network according to an embodiment.

FIG. 2 is a diagram for explaining a relationship of an input feature map and an output feature map in a neural network according to an embodiment.

Referring to FIG. 2, in a layer 2 of a neural network, a first feature map FM1 may correspond to an input feature map, and a second feature map FM2 may correspond to an output feature map. A feature map may denote a data set in which various characteristics of input data are expressed. The first and second feature maps FM1 and FM2 may have elements of 2D matrix or elements of 3D matrix, and a pixel value may be defined in each of the elements. The first and second feature maps FM1 and FM2 may have a width W (or a column), a height H (a row), and a depth D. At this point, the depth D may correspond to the number of channels.

A convolution computation with respect to the first feature map FM1 and a kernel may be performed, and as a result, the second feature map FM2 may be generated. The kernel may be a weight defined on each element and may filter characteristics of the first feature map FM1 by performing a convolution computation with the first feature map FM1. The kernel performs a convolution computation with windows (or tiles) of the first feature map FM1 while shifting the first feature map FM1 with a sliding window method. For each shift, weights included in the kernel respectively may be multiplied by or added to pixel values of windows overlapped in the first feature map FM1. As the first feature map FM1 and the kernel are convoluted, a single channel of the second feature map FM2 may be generated. In FIG. 1, a single kernel is depicted, but actually, the second feature map FM2 of a plurality of channels may be generated by convoluting a plurality of kernels with the first feature map FM1.

The second feature map FM2 may correspond to an input feature map of the next layer. For example, the second feature map FM2 may be an input feature map of a pooling (or a sub-sampling) layer.

In FIGS. 1 and 2, for convenience of explanation, only a schematic architecture of the neural network 1 is depicted. However, it should be understood by those in the art that, unlike as depicted, the neural network 1 may be realized by more than or less than number of layers, feature maps, and kernels, etc. and also, sizes thereof may be changed in various ways.

Figure 3:
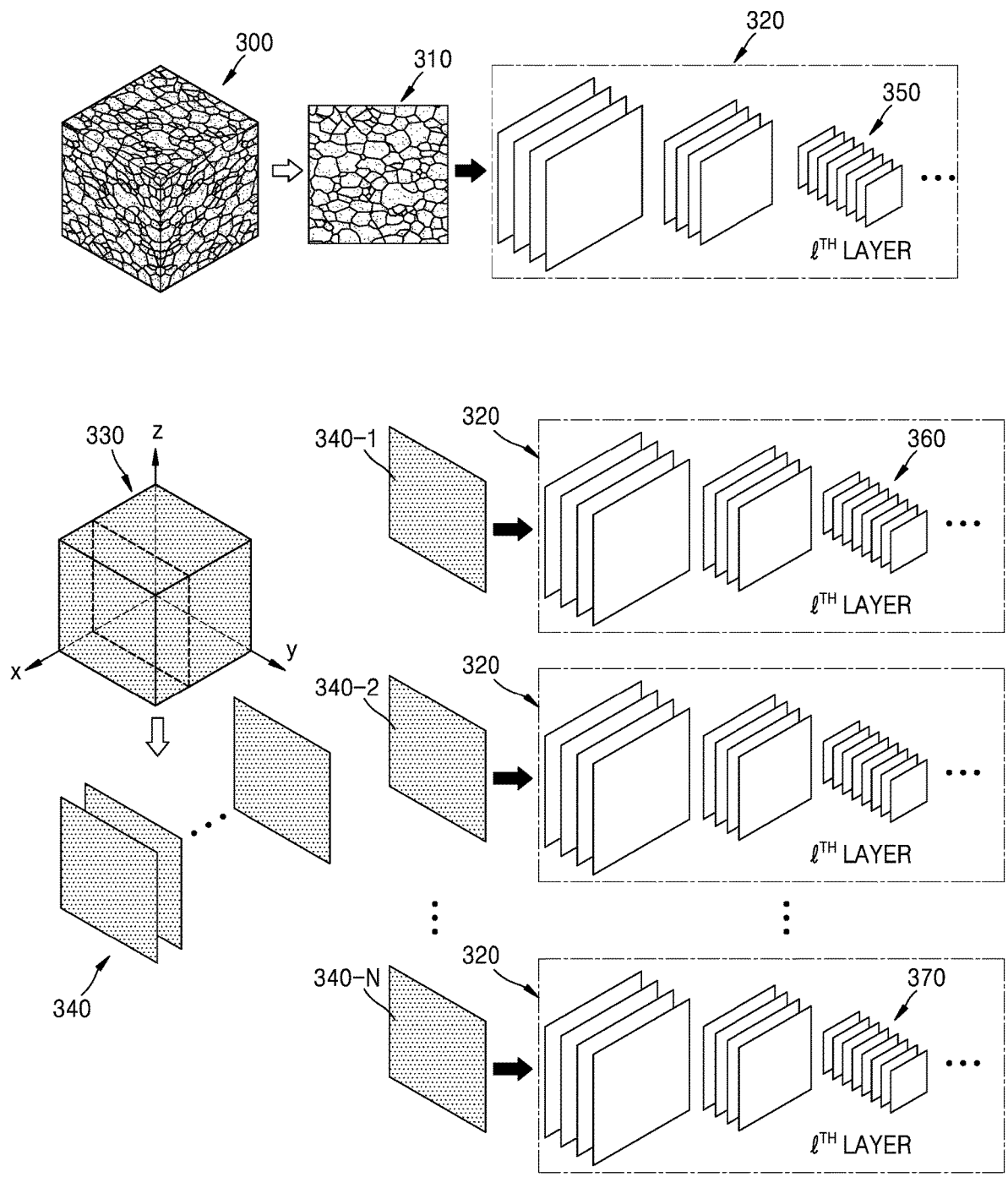
FIG. 3 is a diagram showing a process of treating a 2D original image and cross-sectional images of an initial 3D microstructure by being inputted in a neural network.

FIG. 3 is a diagram showing a process of treating a 2D original image 310 and cross-sectional images 340 of an initial 3D microstructure 330 input in a neural network.

Referring to FIG. 3, the 2D original image 310 and each of cross-sectional images 340 of the initial 3D microstructure 330 may be input to a learned convolution neural network 320.

The 2D original image 310 may be acquired from a material 300 for generating a 3D microstructure. A surface image of the material 300 for generating a 3D microstructure may be readily acquired, but, when a cross-section of the material 300 is cut many times to understand an internal 3D microstructure, excessive energy may be consumed and loss of an image may occur. Accordingly, the disclosure provides a method of generating an internal 3D microstructure of the material 300 by using a neural network based on a surface image, that is, the 2D original image 310 of the material 300.

In detail, the 2D original image 310 may be a surface image at an xy plane, a yz plane, and an xz plane of the material 300 for generating a 3D microstructure according to an embodiment, but the embodiment is not limited thereto.

The 2D original image 310 may be obtained by using an imaging device. According to an embodiment, the imaging device may be a scanning electron microscope (SEM) or an optical microscope. The SEM may obtain a 2D scanning image that shows a surface shape of the material 300 by injecting an electron beam onto the material 300.

The 2D original image 310 may be input to the convolution neural network 320 that is learned in advance. Since the 2D original image 310 is input to the convolution neural network 320, feature maps may be output from each layer that constitutes the convolution neural network 320. In order to generate a 3D microstructure, the neural network apparatus may use feature maps of the 2D original image 310 output from at least one arbitrary layer that constitutes the convolution neural network 320. Referring to FIG. 3, first output feature maps 350 of the 2D original image 310 output from an arbitrary $l^{th}$ layer is depicted.

Referring to FIG. 3, the initial 3D microstructure 330 and the cross-sectional images 340 of the initial 3D microstructure 330 to be input to the convolution neural network 320 are depicted.

In order to configure the initial 3D microstructure 330, a neural network apparatus may define a size of a final 3D microstructure to be generated in advance. The initial 3D microstructure 330 may be an arbitrary 3D microstructure configured to have the same or equal size of the defined final 3D microstructure.

After the size of the 3D microstructure is determined, a plurality of cross-sectional images may be obtained by cutting the initial 3D microstructure 330 in at least a direction. Referring to FIG. 3, a plurality of cross-sectional images 340 are obtained by cutting the initial 3D microstructure 330 in a direction parallel to the yz direction of the initial 3D microstructure 330, but the cutting direction of the initial 3D microstructure 330 is not limited thereto.

Each of the cross-sectional images 340 may be input to the learned convolution neural network 320. Since each of the cross-sectional images 340 is input to the learned convolution neural network 320, feature maps may be output from layers that constitute the learned convolution neural network 320. The neural network apparatus may use the cross-sectional images 340 output from the at least one arbitrary layer that constitutes the learned convolution neural network 320 to generate a 3D microstructure.

The neural network apparatus may obtain second output feature maps 360 from an arbitrary $l^{th}$ layer by inputting a first cross-sectional image 340-1 of the cross-sectional images 340 to a neural network. The neural network apparatus may repeat this operation with respect to each of the cross-sectional images 340, and finally, may obtain second output feature maps 370 from the $l^{th}$ layer by inputting an $N^{th}$ cross-sectional image 340-N of the cross-sectional images 340 to the neural network.

The neural network apparatus may calculate a loss value of the 2D original image 310 in at least one layer that constitutes the convolution neural network 320 with respect to each of the cross-sectional images 340. In detail, the neural network apparatus may calculate a loss value by comparing the first output feature maps 350 of the 2D original image 310 output from an arbitrary $l^{th}$ layer with the second output feature maps 370 of each of the cross-sectional images 340 of the initial 3D microstructure 330.

For example, the neural network apparatus may calculate a loss value by comparing the first output feature maps 350 with the second output feature maps 360 of the first cross-sectional image 340-1 of the cross-sectional images 340. Likewise, the neural network apparatus may calculate a loss value by comparing the first output feature maps 350 with the $N^{th}$ cross-sectional image 340-N of the cross-sectional images 340.

The neural network apparatus may generate a 2D gradient by back-propagating the calculated loss value. Accordingly, the neural network apparatus may generate 2D gradients respectively corresponding to the cross-sectional images 340. Finally, the neural network apparatus may generate a 3D gradient by stacking the 2D gradients. The generated 3D gradient is reflected to the initial 3D microstructure 330, and thus, may update the initial 3D microstructure 330. The loss value calculation and the generation of gradient will be described in detail below with reference to FIGS. 4 through 7.

Figure 4:
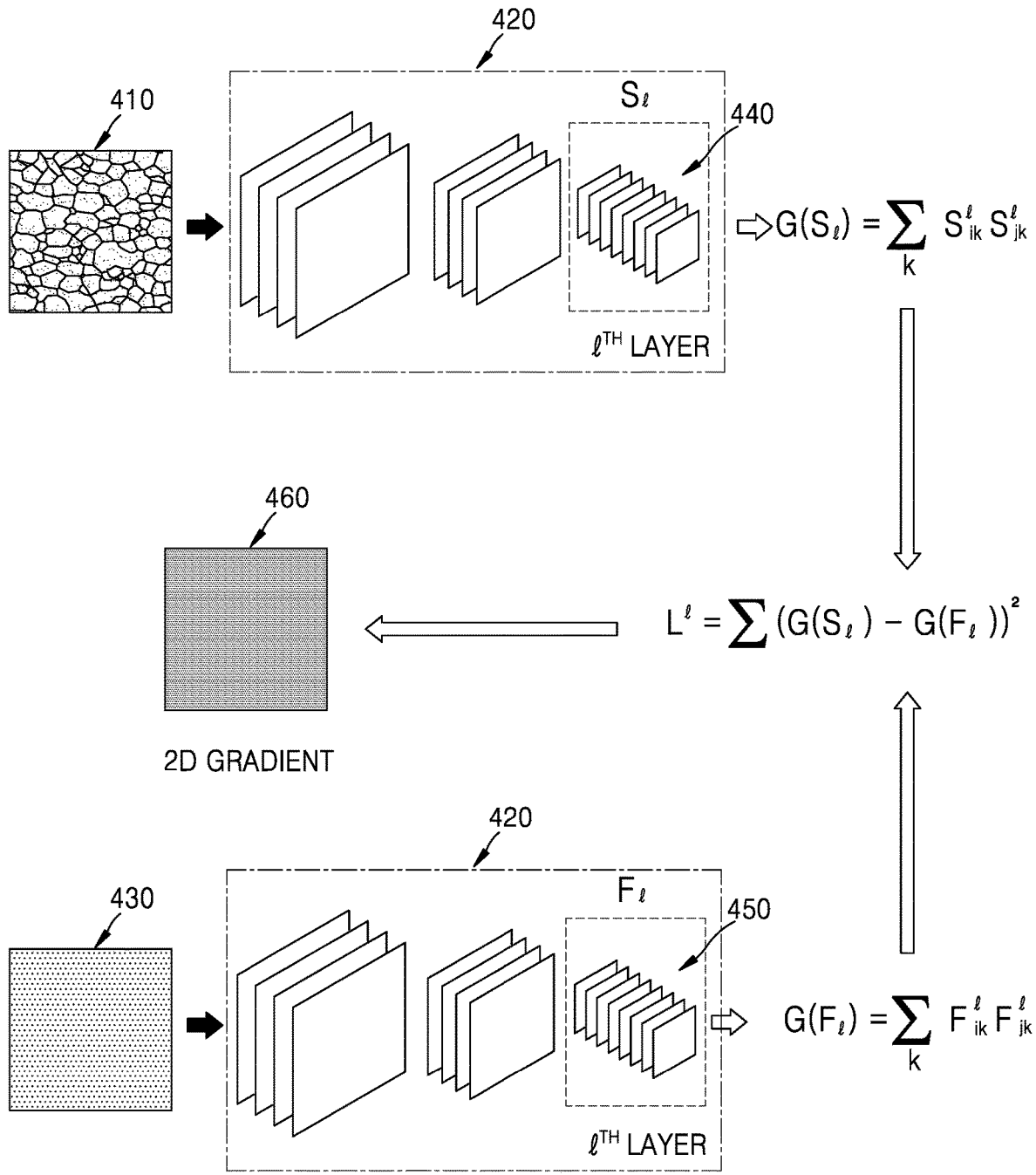
FIG. 4 is a diagram showing a process of calculating a loss value in a lth layer of a convolution neural network.

FIG. 4 is a diagram showing a process of calculating a loss value in a $l^{th}$ layer of a convolution neural network according to an embodiment.

Referring to FIG. 4, a 2D original image 410 and cross-sectional images 430 of an initial 3D microstructure respectively may be input to a learned convolution neural network 420.

At this point, feature maps 440 of the 2D original image 410 output from each layer of the learned convolution neural network 420 may be vectorized in a matrix type. A matrix vectorized of the feature maps 440 of the 2D original image 410 output from an arbitrary $l^{th}$ layer of the learned convolution neural network 420 is referred to as an $S_l$.

Likewise, feature maps of the cross-sectional images 430 output from each layer of the learned convolution neural network 420 may be vectorized in a matrix type. A matrix vectorized of feature maps 450 of the cross-sectional images 430 output from an arbitrary $l^{th}$ layer of the learned convolution neural network 420 is referred to as a $F_l$.

Next, a loss value L that indicates a difference between the 2D original image 410 and the cross-sectional image 430 at the arbitrary layer may be calculated by using the matrix $S_l$ of the 2D original image 410 and the matrix $F_l$ of the cross-sectional image 430 of an initial 3D microstructure.

The loss value L at the layer may be calculated such that gram matrixes are obtained with respect to the matrix $S_l$ and the matrix $F_l$, and a square of Frobenius norm between a gram matrix $G(S_l)$ of the matrix $S_l$ and a gram matrix $G(F_l)$ of the gram matrix $F_l$ is obtained. That is, a loss value $L^l$ at a $l^{th}$ layer may be expressed as Equation 1 below.

$$L^l = \Sigma(G(S_l) - G(G_l))^2 \quad \text{[Equation 1]}$$

The gram matrix may include information indicating a relationship of the feature maps generated through a convolution layer of the learned convolution neural network 420. The gram matrix may be expressed as Equation 2 below.

$$G_{ij}^1 = \sum_k A_{ik}^1 A_{jk}^1 \quad \text{[Equation 2]}$$

When a $l^{th}$ layer of the learned convolution neural network 420 includes $c_l$ number of filters, the $c_l$ number of feature maps generated by passing through the $l^{th}$ layer respectively may have a size of $M_l$ obtained by multiplying a width $W_l$ and a height $H_l$. Accordingly, the $c_l$ number of feature maps generated by passing through the $l^{th}$ layer may be vectorized to a matrix $A^l$ having a size of $[c_l \times M_l]$ ($c_l$ is the number of channels). When a gram matrix is obtained by using the matrix $A^l$, the size of the gram matrix may be $[c_l \times c_l]$.

Referring to Equation 2, a gram matrix $G_{ij}^l$ may be obtained by an inner production of $A_{ik}^l$ indicating a vectorized feature map by passing through an $i^{th}$ filter in and $A_{jk}^l$ indicating a vectorized feature map by passing through $j^{th}$ filter in a $l^{th}$ convolution layer.

According to Equation 2, a gram matrix of a matrix $S_l$ that vectorizes the feature maps 450 of the 2D original image 410 output from the $l^{th}$ layer may be expressed as Equation 3 below.

$$G(S_1) = \sum_k S_{ik}^1 S_{jk}^1 \quad \text{[Equation 3]}$$

Likewise, a gram matrix of matrix $F_l$ that vectorizes the feature maps 450 of the cross-sectional images 430 of the initial 3D microstructure output from the $l^{th}$ layer may be expressed as Equation 4 below.

$$G(F_1) = \sum_k F_{ik}^1 F_{jk}^1 \quad \text{[Equation 4]}$$

A loss value $L^l$ indicating a difference between the 2D original image 410 and the cross-sectional image 430 in the $l^{th}$ layer according to Equation 1 may be calculated by using the gram matrix of the matrix $S_l$ calculated according to Equation 3 and the gram matrix of the matrix $F_l$ calculated according to Equation 4.

The neural network apparatus may generate a 2D gradient 460 by back-propagating the loss value $L^l$ at the $l^{th}$ layer to the learned convolution neural network 420, as described in detail with reference to FIG. 5.

Meanwhile, in FIG. 4, a method of calculating a loss value using a gram matrix. However, the method of calculating a loss value is not limited thereto. For example, a loss value may be calculated by using a maximum mean discrepancy (MMD) of a convolution neural network or a mean error method.

Figure 5:
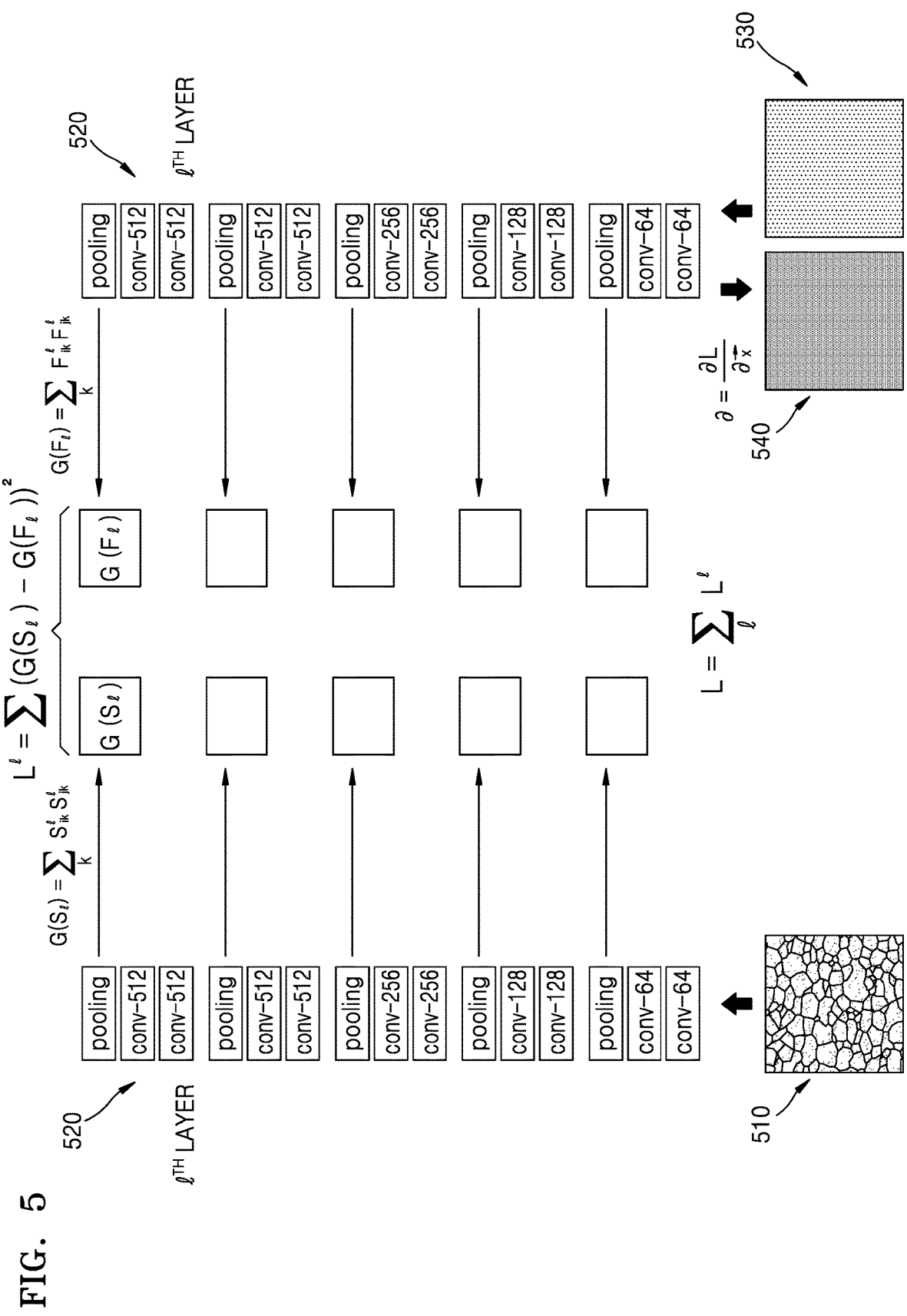
FIG. 5 is a diagram showing a process of generating a 2D gradient from a loss value between a 2D original image and a cross-sectional image of an initial 3D microstructure.

FIG. 5 is a diagram showing a process of generating a 2D gradient from a loss value between a 2D original image 510 and a cross-sectional image 530 of an initial 3D microstructure.

Referring to FIG. 5, the 2D original image 510 and the cross-sectional image 530 of an initial 3D microstructure may be input to a learned convolution neural network 520.

The learned convolution neural network 520 may be, for example, a VGG-19 network, but is not limited thereto. The VGG-19 network may be configured of total 16 convolution layers, 5 pooling layers, and 3 fully connected layers. The learned convolution neural network 520 may be configured of convolution layers and pooling layers without including fully connected layers.

When the 2D original image 510 is input to the learned convolution neural network 520, feature maps output from each of the pooling layers of the learned convolution neural network 520 may be obtained.

Likewise, when the cross-sectional image 530 of an initial 3D microstructure is input to the learned convolution neural network 520, feature maps output from each of the pooling layers of the learned convolution neural network 520 may be obtained.

At this point, a loss value $L^l$ may be calculated by using the feature maps of the 2D original image 510 and the feature maps of the cross-sectional image 530 output from a $l^{th}$ pooling layer of the learned convolution neural network 520. The process of calculating the loss value $L^l$ may be the same as the process described with reference to FIG. 4.

A final loss value L indicating a difference between the 2D original image 510 and the cross-sectional image 530 of an initial 3D microstructure may be obtained by adding all the loss values $L^l$ calculated in each of the pooling layers of the learned convolution neural network 520. The loss L may be expressed as Equation 5 below.

$$L = \sum_1 L^1 \quad \text{[Equation 5]}$$

Next, the neural network apparatus may calculate a gradient by applying a loss value to a back-propagation algorithm. The back-propagation algorithm is an algorithm that renews a neural network so that the loss value is minimum by sequentially performing partial differential in a direction opposite to the output direction.

In detail, a 2D gradient $$\partial = \frac{\partial L}{\partial \vec{x}}$$

540 may be generated from the loss value L by using a gradient descent algorithm that calculates a gradient of error in the back-propagation algorithm. $\vec{x}$ may be a vector including information of pixels constituting the cross-sectional image 530 of an initial 3D microstructure.

Figure 6:
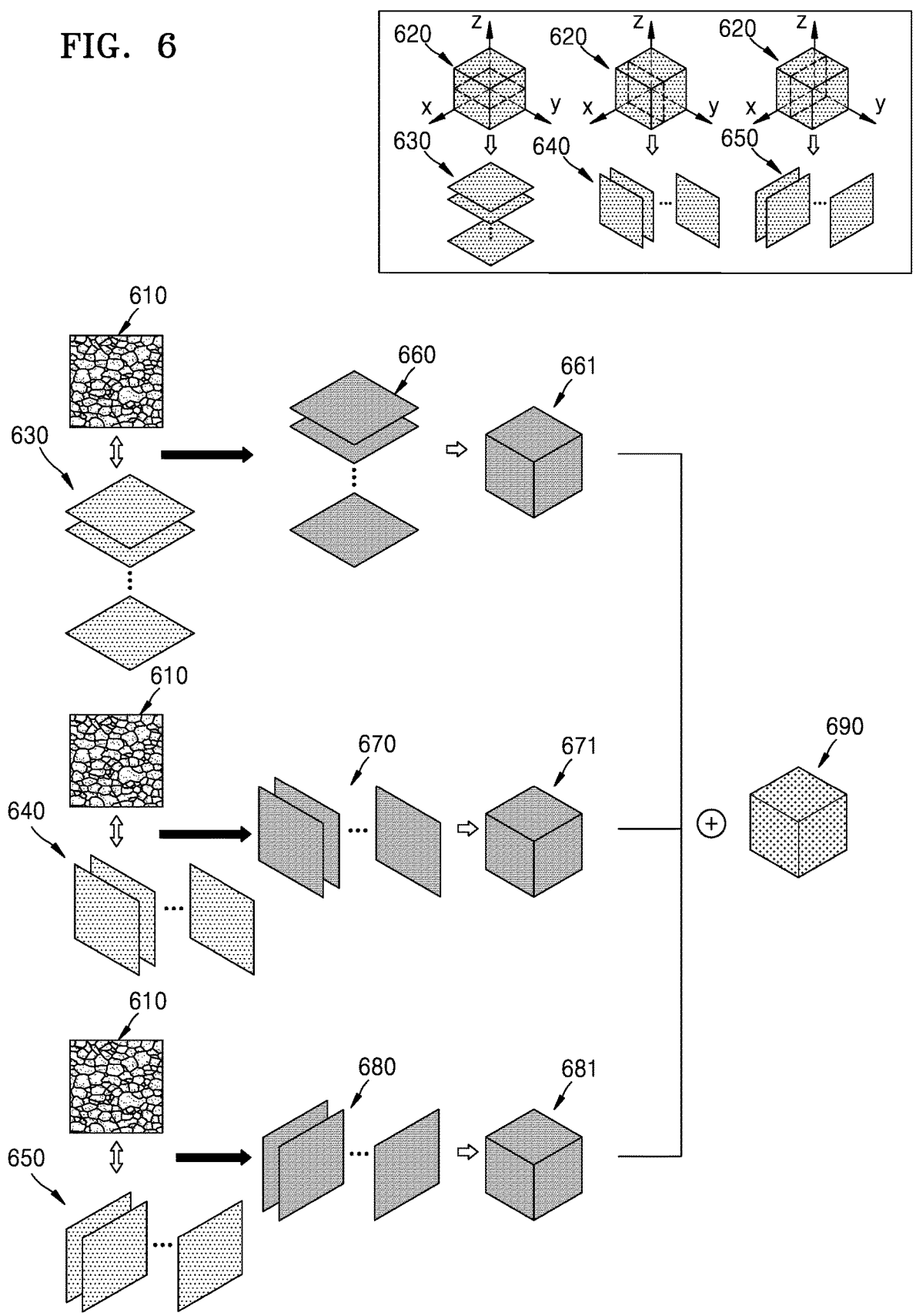
FIG. 6 is a diagram showing a process of generating a gradient by using a plurality of images acquired by disassembling an initial 3D microstructure in a direction parallel to an xy plane, a yz plane, and an xz plane.

FIG. 6 is a diagram showing a process of generating a gradient by using a plurality of images acquired by disassembling an initial 3D microstructure in a direction parallel to an xy plane, a yz plane, and an xz plane.

Referring to FIG. 6, the neural network apparatus may obtain a plurality of cross-sectional images by disassembling an initial 3D microstructure 620 in at least a direction. In detail, the initial 3D microstructure 620 may be disassembled in directions respectively parallel to the xy plane, the yz plane, and the xz plane of the initial 3D microstructure 620.

In this case, the plurality of cross-sectional images may include first cross-sectional images 630 obtained by disassembling the initial 3D microstructure 620 in a direction parallel to the xy plane, second cross-sectional images 640 obtained by disassembling the initial 3D microstructure 620 in a direction parallel to the yz plane, and third cross-sectional images 650 obtained by disassembling the initial 3D microstructure 620 in a direction parallel to the xz plane.

The neural network apparatus may generate 2D gradients respectively corresponding to a plurality of cross-sectional images by inputting a 2D original image 610 and each of the plurality of cross-sectional images to a convolution neural network. The 2D gradients may be generated from a loss value using a gradient descent algorithm, and the magnitude of the 2D gradients may be equal to the size of the cross-sectional image.

In detail, the neural network apparatus may calculate a loss value between the 2D original image 610 and each of the first cross-sectional images 630, and may generate 2D gradients 660 corresponding to the first cross-sectional images 630 from the loss value.

Likewise, the neural network apparatus may calculate a loss value between the 2D original image 610 and each of the second cross-sectional images 640, and may generate 2D gradients 670 corresponding to the second cross-sectional images 640 from the loss value. Finally, the neural network apparatus may calculate a loss value between the 2D original image 610 and each of the third cross-sectional images 650, and may generate 2D gradients 680 corresponding to the third cross-sectional images 650 from the loss value.

Surface images at an xy plane, a yz plane, and an xz plane of a material to generate a 3D microstructure may be different from each other. Accordingly, the 2D original image may be a plurality of 2D original images, for example, a first 2D original image which is a surface image at the xy plane of the material, a second 2D original image which is a surface image at the yz plane of the material, and a third 2D original image which is a surface image at the xz plane of the material.

In this case, the neural network apparatus may generate 2D gradients by calculating loss values between the first 2D original image and each of the first cross-sectional images 630, loss values between the second 2D original image and each of the second cross-sectional images 640, and loss values between the third 2D original image and each of the third cross-sectional images 650.

Next, the neural network apparatus may generate a 3D gradient by stacking the 2D gradients respectively corresponding to the cross-sectional images.

In detail, the neural network apparatus may generate a first 3D gradient 661 by stacking 2D gradients 660 respectively corresponding to the first cross-sectional images 630. Likewise, the neural network apparatus may generate a second 3D gradient 671 by stacking 2D gradients 670 respectively corresponding to the second cross-sectional images 640 and may generate a third 3D gradient 681 by stacking 2D gradients 680 respectively corresponding to the third cross-sectional images 650.

Finally, the neural network apparatus may generate a final 3D gradient 690 by adding the first 3D gradient 661, the second 3D gradient 671, and the third 3D gradient 681. The neural network apparatus may update the initial 3D microstructure by reflecting the final 3D gradient 690 to the initial 3D microstructure.

Figure 7:
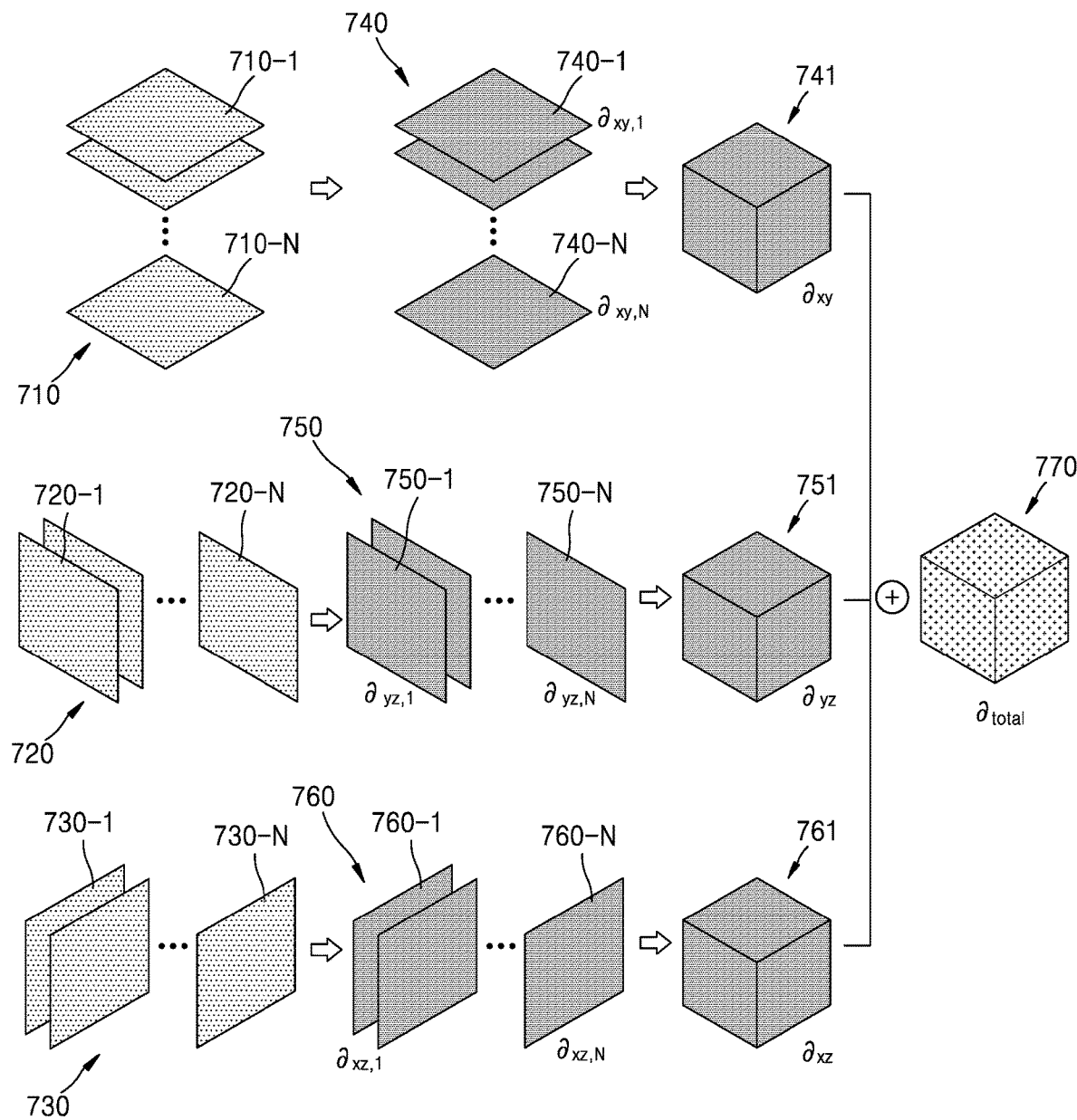
FIG. 7 is a diagram showing a process of updating an initial 3D microstructure by using a plurality of images acquired by disassembling the initial 3D microstructure in directions parallel to an xy plane, a yz plane, and an xz plane.

FIG. 7 is a diagram showing a process of updating an initial 3D microstructure by using a plurality of images acquired by disassembling the initial 3D microstructure in directions parallel to an xy plane, a yz plane, and an xz plane.

Referring to FIG. 7, a plurality of cross-sectional images obtained by disassembling an initial 3D microstructure in directions parallel to the xy plane, the yz plane, and the xz plane are depicted.

Assuming that a pixel size in a z-axis direction of the initial 3D microstructure is N, the number of first cross-sectional images 710 obtained by disassembling the initial 3D microstructure in a direction parallel to the xy plane may be N. Likewise, assuming that a pixel size in an x-axis direction of the initial 3D microstructure is N, the number of second cross-sectional images 720 obtained by disassembling the initial 3D microstructure in a direction parallel to the yz plane may be N, and also, assuming that a pixel size in a y-axis direction of the initial 3D microstructure is N, the number of third cross-sectional images 730 obtained by disassembling the initial 3D microstructure in a direction parallel to the xz plane may be N.

The neural network apparatus may generate 2D gradients respectively corresponding to the first cross-sectional images 710. For example, a 2D gradient 740-1 corresponding to a first cross-sectional image 710-1 of the first cross-sectional images 710 may be $\partial_{xy,1}$, and a 2D gradient 740-N corresponding to an $N^{th}$ cross-sectional image 710-N of the first cross-sectional images 710 may be $\partial_{xy,N}$.

Also, the neural network apparatus may generate 2D gradients 750 corresponding to the second cross-sectional images 720. For example, a 2D gradient 750-1 corresponding to a first cross-sectional image 720-1 of the second cross-sectional images 720 may be $\partial_{yz,1}$, and a 2D gradient 750-N corresponding to an $N^{th}$ cross-sectional image 720-N of the first cross-sectional images 720 may be $\partial_{yz,N}$.

Likewise, the neural network apparatus may generate 2D gradients 760 corresponding to the third cross-sectional images 730. For example, a 2D gradient 760-1 corresponding to a first cross-sectional image 730-1 of the second cross-sectional images 730 may be $\partial_{xz,1}$, and a 2D gradient 760-N corresponding to an $N^{th}$ cross-sectional image 730-N of the first cross-sectional images 730 may be $\partial_{xz,N}$.

Next, the neural network apparatus may generate a 3D gradient 741 $\partial_{xy}$ by stacking the $\partial_{xy,1}$ through $\partial_{xy,N}$ which are 2D gradients generated with respect to each of the N number of the first cross-sectional images 710.

Likewise, the neural network apparatus may generate a 3D gradient 751 $\partial_{yz}$ by stacking the $\partial_{yz,1}$ through $\partial_{yz,N}$ which are 2D gradients generated with respect to each of the second cross-sectional images 720, and also, may generate a 3D gradient 761 $\partial_{xy}$ by stacking the $\partial_{xz,1}$ through $\partial_{xz,N}$ which are 2D gradients generated with respect to each of the third cross-sectional images 730.

Finally, the neural network apparatus may generate a final 3D gradient 770 $\partial_{total}$ by adding all of the 3D gradients $\partial_{xy}$, $\partial_{yz}$, and $\partial_{xz}$. The neural network apparatus may update the initial 3D microstructure by reflecting the final 3D gradient 770 to the initial 3D microstructure.

The neural network apparatus may again obtain a plurality of cross-sectional images by disassembling the updated 3D microstructure in directions respectively parallel to the xy plane, the yz plane, and the xz plane and may calculate loss values between a 2D original image and each of the plurality of cross-sectional images.

At this point, a loss value may be determined as to whether the loss value is greater than a predetermined threshold value or not. The predetermined threshold value may be a reference value for determining the degree of similarity between a 2D original image and a cross-sectional image of an initial 3D microstructure and may be defined in advance.

When the loss value is greater than the predetermined threshold value, a new final 3D gradient may be generated by using the loss value. The new final 3D gradient may be reflected to the updated initial 3D microstructure, and thus, the updated initial 3D microstructure may be re-updated.

When the loss value is less than the predetermined threshold value, the updated initial 3D microstructure may be determined as the final 3D microstructure.

Through the algorithm described above, a final 3D microstructure may be generated based on a 2D original image by repeatedly updating the initial 3D microstructure.

Figure 8:
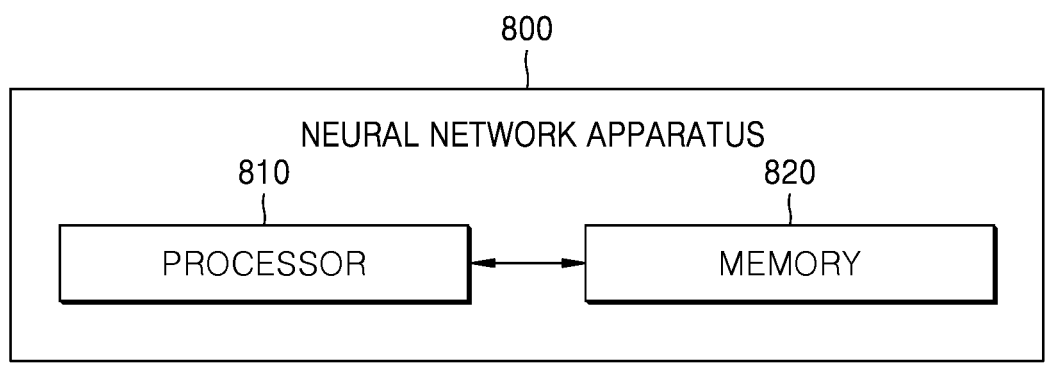
FIG. 8 is a block diagram of a hardware configuration of a neural network apparatus.

FIG. 8 is a block diagram of a hardware configuration of a neural network apparatus 800.

In detail, the neural network apparatus 800 may be a device that generates a 3D microstructure by using a neural network.

The neural network apparatus 800 may be realized as various kinds of devices, such as personal computers (PCs), mobile devices, embedded devices, etc. As practical examples, smart phones, tablet devices, augmented reality (AR) devices, internet of things (IoT) devices, autonomous vehicles, robotics, or medical devices that perform a voice recognition, an image recognition, an image classification using a neural network, but the devices are not limited thereto. Furthermore, the neural network apparatus 800 may correspond to an exclusive hardware (HW) accelerator mounted on the devices described above. The neural network apparatus 800 may be a HW accelerator, such as a neural processing unit (NPU), a tensor processing unit (TPU), an neural engine, etc. which is an exclusive module for driving a neural network, but is not limited thereto.

Referring to FIG. 8, the neural network apparatus 800 may include a processor 810 and a memory 820. In the neural network apparatus 800 depicted in FIG. 8, constituent elements that are related to the present embodiment are depicted. Accordingly, it should be understood by those of ordinary skill in the art that the neural network apparatus 800 may further include general constituent elements besides the constituent elements depicted in FIG. 8.

The processor 810 may control overall functions for executing the neural network apparatus 800. For example, the processor 810 controls the neural network apparatus 800 by executing programs stored in the memory 820 of the neural network apparatus 800. The processor 810 may be realized as a central processing unit (CPU), a graphics processing unit (GPU), or an application processor (AP) included in the neural network apparatus 800, but is not limited thereto.

The memory 820 is hardware that stores various data processing in the neural network apparatus 800. For example, the memory 820 may store data processed and data to be processed in the neural network apparatus 800. Also, the memory 820 may store applications to be driven by the neural network apparatus 800 or drivers, etc. The memory 820 may include random access memory (RAM), such as dynamic RAM or static RAM, read-only memory (ROM), electrically erasable programmable read-only memory (EEPROM), a CD-ROM, a blue ray, or other optical disc storage, a hard disc drive (HDD), a solid state drive (SSD) or a flash memory.

The processor 810 may read/write data, for example, image data, feature map data, etc. to be processed in the neural network apparatus 800 from the memory 820 and may execute a neural network by using the read/write data.

For example, the processor 810 may obtain a 2D original image obtained by using an SEM or an optical microscope from the memory 820. The processor 810 may define a size of a final 3D microstructure to be generated and may configure an arbitrary 3D microstructure having a size equal to that of the final 3D microstructure as an initial 3D microstructure.

The processor 810 may obtain a plurality of cross-sectional images by disassembling the initial 3D microstructure in directions parallel to the xy plane, the yz plane, and the xz plane of the initial 3D microstructure. The processor 810 may obtain output feature map data in at least a layer than constitutes a neural network by inputting a 2D original image and a plurality of cross-sectional images of an initial 3D microstructure into the neural network. Unlike the neural network 1 depicted in FIG. 1, the neural network actually driven in the neural network apparatus 800 may be realized as a very complicated architecture. Accordingly, the processor 810 may obtain output feature map data by performing a lot of convolution computations.

The processor 810 may calculate a loss value that indicates a difference between a 2D original image and a cross-sectional image of an initial 3D microstructure by using the output feature map data. The processor 810 may calculate a final loss value L by adding all loss values between the 2D original image and a cross-sectional image of the initial 3D microstructure of an arbitrary $l^{th}$ layer of the neural network.

The processor 810 may obtain a 2D gradient from a gradient descent algorithm by back-propagating the loss value L to the neural network. Afterwards, the processor 810 may obtain a 3D gradient by stacking 2D gradients that are calculated with respect to cross-sectional images by disassembling the initial 3D microstructure in directions parallel to the xy plane, the yz plane, and the xz plane of the initial 3D microstructure.

The processor 810 may update the initial 3D microstructure by reflecting the final 3D gradient to the initial 3D microstructure.

According to another embodiment, the processor 810 may receive a first 3D microstructure image of the material as a input 3D microstructure image. According to an embodiment, the first 3D microstructure image may be a template representing the 3D structure of the material. Further, the processor 810 may obtain a plurality of cross-sectional images from the first 3D microstructure. According to an embodiment, the processor 810 may dissect the first microstructure image at different locations to obtain the plurality of cross-sectional images. According to an embodiment, the different locations may be at an uniform interval.

Further, the processor 810 may generate a plurality of first output feature map information with respect to at least one layer of the neural network based on the plurality of cross-sectional images, each of the plurality of first output features map information uniquely corresponding to one of the plurality of cross-sectional images.

Moreover, the processor 810 may receive a 2D image of the material. According to an embodiment, the 2D image 310 may be an actual image of a surface of the material captured using an imaging device. According to an embodiment, the imaging device may be a scanning electron microscope (SEM) or an optical microscope. The SEM may obtain a 2D scanning image that shows a surface shape of the material 300 by injecting an electron beam onto the material 300.

The processor 810 may generate a second output feature map information with respect to at least one layer of the neural network based on the 2D image to the neural network.

According to an embodiment, the plurality of first output feature map information and the second output features map information may be a data set in which various characteristics of input data are expressed. The plurality of first output feature map information and the second output features map information may have elements of 2D matrix or elements of 3D matrix, and a pixel value may be defined in each of the elements. The plurality of first output feature map information and the second output features map information may have a width W (or a column), a height H (a row), and a depth D. At this point, the depth D may correspond to the number of channels.

According to an embodiment, the processor 810 may generate a 3D gradient by comparing each of the plurality of first output feature map information with the second output feature map information and generate a second 3D microstructure based on the generated 3D gradient. According to an embodiment, the second 3D microstructure may be a output as s final 3D microstructure of the material.

According to an embodiment, the processor 810 may calculate a plurality of loss values based on results from comparing each of the plurality of first output feature map information with the second output feature map information, generate a plurality of 2D gradients corresponding to each of the plurality of cross-sectional images by applying the plurality of loss values to a back-propagation algorithm in the neural network and stack the plurality of 2D gradients to generate the 3D gradient.

According to another embodiment, the processor 810 may repeat the operations of described above using the second 3D microstructure as the new input microstructure image until the loss value is below a threshold.

Figure 9:
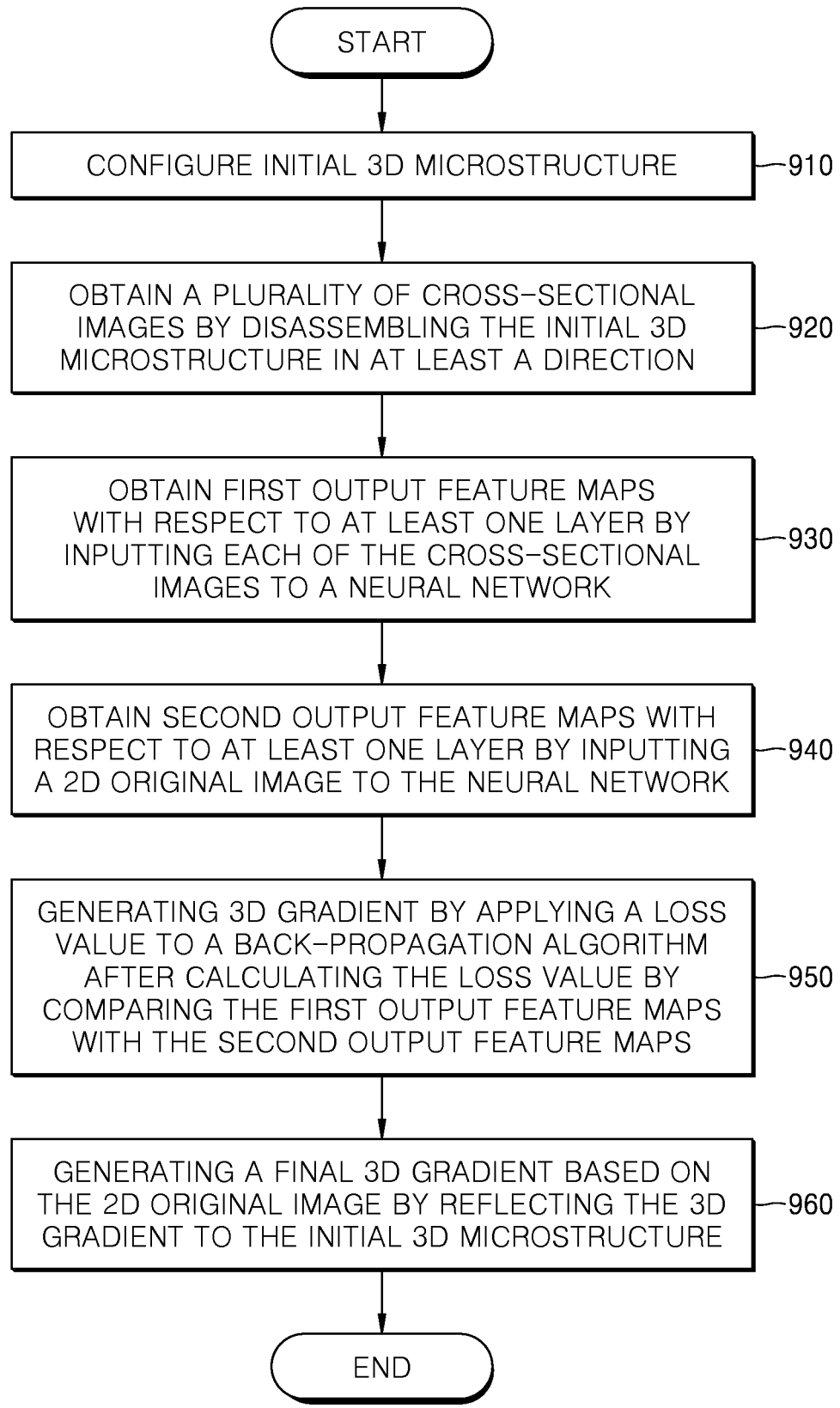
FIG. 9 is a flowchart of a process of generating an initial 3D microstructure in a neural network apparatus.

FIG. 9 is a flowchart of a process of generating a 3D microstructure in the neural network apparatus 800.

In operation 910, the neural network apparatus 800 may configure an initial 3D microstructure. In order to configure the initial 3D microstructure, a size of a final 3D microstructure to be generated may be defined in advance. The initial 3D microstructure may be an arbitrary 3D microstructure configured to have a size equal to that of the defined final 3D microstructure.

In operation 920, the neural network apparatus 800 may obtain a plurality of cross-sectional images of the initial 3D microstructure by disassembling the initial 3D microstructure in at least one direction. In detail, the plurality of cross-sectional images may include first cross-sectional images obtained by disassembling the initial 3D microstructure in a direction parallel to an xy plane of the initial 3D microstructure, second cross-sectional images obtained by disassembling the initial 3D microstructure in a direction parallel to a yz plane of the initial 3D microstructure, and third cross-sectional images obtained by disassembling the initial 3D microstructure in a direction parallel to an xz plane of the initial 3D microstructure.

In operation 930, the neural network apparatus 800 may obtain first output feature maps with respect to at least one layer that constitutes a neural network by inputting each of the cross-sectional images to the neural network. The neural network may correspond to a convolution neural network that is learned in advance.

In operation 940, the neural network apparatus 800 may obtain second output feature maps with respect to at least one layer by inputting a 2D original image to the neural network. The 2D original image may be obtained by using an SEM or an optical microscope and may be stored in a memory. The 2D original image may be surface images at an xy plane, a yz plane, and an xz plane of a material to generate a 3D microstructure.

In operation 950, the neural network apparatus 800 may calculate a loss value by comparing the first output feature maps with the second output feature maps and may generate a 3D gradient by applying the loss value to a back-propagation algorithm. The neural network apparatus 800 may generate the 3D gradient by stacking 2D gradients generated from the loss value that is obtained with respect to each of the cross-sectional images obtained by disassembling the initial 3D microstructure in a direction. The neural network apparatus 800 may generate a final 3D gradient by adding all 3D gradients respectively corresponding to cross-sectional images obtained by disassembling the initial 3D microstructure in a direction parallel to the xy plane, cross-sectional images obtained by disassembling the initial 3D microstructure in a direction parallel to the yz plane, and cross-sectional images obtained by disassembling the initial 3D microstructure in a direction parallel to the xz plane of the initial 3D microstructure.

In operation 960, the neural network apparatus 800 may generate a final 3D microstructure based on a 2D original image by reflecting the 3D gradient to the initial 3D microstructure. The neural network apparatus 800 may update the initial 3D microstructure by reflecting the final 3D gradient to the initial 3D microstructure.

The disclosure may provide a method and apparatus for generating a 3D microstructure using a neural network. In detail, the 3D microstructure may be generated based on a 2D original image using the neural network. Accordingly, it is unnecessary to cut a cross-section of a material many times to generate a 3D microstructure, and thus, it is efficient in view of energy consumption. Also, it is possible to generate a 3D microstructure so that a cross-section of the generated 3D microstructure is similar to a particle shape in a 2D original image.

Embodiments of the disclosure can also be implemented in the form of a computer-readable recording medium comprising commands executable by a computer, such as program modules, being executed by a computer. The computer readable medium may be any usable medium that may be accessed by a computer, and may include any usable medium, such as, a volatile and non-volatile medium and a discrete type and non-discrete type medium. Also, the computer readable medium may include all computer storing media and communication media. The computer storing medium may include any medium, such as, a volatile and non-volatile medium and a discrete type and non-discrete type medium that is realized by a method or technique for storing information, such as, a computer readable command, a data structure, a program module, or other data. The communication medium may include other data of modulated signal, such as, a computer readable command, a data structure, a program module, or a carrier signal, or other transmission mechanism, and an arbitrary information medium.

Also, in the specification, a "unit" may be a hardware component, such as a processor or a circuit and/or a software component that is executed by the hardware component like the processor.

The embodiments are examples, and thus, it will be understood by those of ordinary skill in the art that various changes in form and details may be made therein without departing from the spirit and scope of the invention. Therefore, the embodiments should be considered in descriptive sense only and not for purposes of limitation. For example, each constituent element that is described as a singular form may be embodied in distribution forms. Also, constituent elements that are described in distribution forms may be embodied in a combined form.

Therefore, the scopes of the exemplary embodiments are defined not by the detailed description but by the appended claims, and all differences within the scope will be construed as being included in the exemplary embodiments.

What is claimed is:

1. A method of generating a 3D microstructure using a neural network, the method comprising:
    configuring an initial 3D microstructure;
    obtaining a plurality of cross-sectional images by disassembling the initial 3D microstructure in at least one direction of the initial 3D microstructure;
    generating first output feature maps with respect to at least one layer of the neural network based on each of the plurality of cross-sectional images to the neural network;
    generating second output feature maps with respect to the at least one layer in the neural network based on a 2D original image;
    generating a 3D gradient by applying a loss value based on the first output feature maps and the second output feature maps to a back-propagation algorithm in the neural network; and
    generating a final 3D microstructure by modifying the initial 3D microstructure based on the 3D gradient.

2. The method of claim 1, wherein the generating of the 3D gradient comprises:
    generating 2D gradients respectively corresponding to each of the plurality of cross-sectional images by applying the loss value to the back-propagation algorithm, the loss value being calculated by comparing the first output feature maps with the second output feature maps; and
    generating the 3D gradient by stacking the 2D gradients.

3. The method of claim 1, wherein
    the at least one direction comprises one of a first direction parallel to an xy plane, a second direction parallel to a yz plane, or a third direction parallel to an xz plane of the initial 3D microstructure, and
    the plurality of cross-sectional images comprises a plurality of first cross-sectional images obtained by disassembling the initial 3D microstructure in the first direction parallel to the xy plane, a plurality of second cross-sectional images obtained by disassembling the initial 3D microstructure in the second direction parallel to the yz plane, and a plurality of third cross-sectional images obtained by disassembling the initial 3D microstructure in the third direction parallel to the xz plane.

4. The method of claim 3, wherein the generating of the 3D gradient comprises:
    generating 2D gradients respectively corresponding to each of the plurality of cross-sectional images by applying the loss value to the back-propagation algorithm;
    generating a first 3D gradient from the 2D gradients respectively corresponding to the plurality of first cross-sectional images;
    generating a second 3D gradient from the 2D gradients respectively corresponding to the plurality of second cross-sectional images;
    generating a third 3D gradient from the 2D gradients respectively corresponding to the plurality of third cross-sectional images; and
    generating a final 3D gradient by adding the first 3D gradient, the second 3D gradient, and the third 3D gradient.

5. The method of claim 3, wherein, when the initial 3D microstructure has a pixel size of a×b×c (a, b, and c respectively are natural numbers), the total number of the first cross-sectional images, the second cross-sectional images, and the third cross-sectional images is a+b+c.

6. The method of claim 1, wherein the generating of the final 3D microstructure comprises:
    generating an intermediate 3D microstructure by modifying the initial 3D microstructure based on the 3D gradient;
    generating a new 3D gradient based on the intermediate 3D microstructure when the loss value is greater than a predetermined value and modifying the intermediate 3D microstructure based on the new 3D gradient; and
    determining the intermediate 3D microstructure as the final 3D microstructure when the loss value is less than the predetermined value.

7. The method of claim 1, wherein the generating of the 3D gradient comprises:
    obtaining a first gram matrix using the first output feature maps respectively output from at least one layer; and
    obtaining a second gram matrix using the second output feature maps respectively output from at least one layer, wherein the loss value is calculated by comparing the first gram matrix with the second gram matrix.

8. The method of claim 1, wherein the neural network comprises a convolution neural network (CNN).

9. A non-transitory computer-readable recording medium comprising a computer-readable program for executing the method of claim 1 in a computer.

10. An apparatus configured to generate a 3D microstructure using a neural network, the apparatus comprising:
a memory configured to store at least one program; and
at least one processor configured to process data in the neural network by executing the at least one program,
wherein the at least one processor is configured to:
configure an initial 3D microstructure;
obtain a plurality of cross-sectional images by disassembling the initial 3D microstructure in at least one direction;
generate first output feature maps with respect to at least one layer of the neural network based on each of the plurality of cross-sectional images to the neural network;
generate second output feature maps with respect to the at least one layer in the neural network based on a 2D original image;
generate a 3D gradient by applying a loss value based on the first output feature maps with the second output feature maps to a back-propagation algorithm in the neural network; and
generate a final 3D microstructure by modifying the initial 3D microstructure based on the 3D gradient.

11. The apparatus of claim 10, wherein the at least one processor is further configured to:
generate 2D gradients respectively corresponding to each of the plurality of cross-sectional images by applying the loss value to the back-propagation algorithm, the loss value being calculated by comparing the first output feature maps with the second output feature maps; and
generate the 3D gradient by stacking the 2D gradients.

12. The apparatus of claim 10, wherein the at least one direction comprises one of a first direction parallel to an xy plane, a second direction parallel to a yz plane, or a third direction parallel to an xz plane of the initial 3D microstructure, and the plurality of cross-sectional images comprises a plurality of first cross-sectional images obtained by disassembling the initial 3D microstructure in the first direction parallel to the xy plane, a plurality of second cross-sectional images obtained by disassembling the initial 3D microstructure in the second direction parallel to the yz plane, and a plurality of third cross-sectional images obtained by disassembling the initial 3D microstructure in the third direction parallel to the xz plane.

13. The apparatus of claim 12, wherein the at least one processor is further configured to:
generate 2D gradients respectively corresponding to each of the plurality of cross-sectional images by applying the loss value to the back-propagation algorithm;
generate a first 3D gradient from 2D gradients respectively corresponding to the first cross-sectional images;
generate a second 3D gradient from the 2D gradients respectively corresponding to the second cross-sectional images; generates a third 3D gradient from the 2D gradients respectively corresponding to the third cross-sectional images; and
generate a final 3D gradient by adding the first 3D gradient, the second 3D gradient, and the third 3D gradient.

14. The apparatus of claim 10, wherein, when the initial 3D microstructure has a pixel size of a×b×c (a, b, and c respectively are natural numbers), the total number of first cross-sectional images, second cross-sectional images, and third cross-sectional images is a+b+c.

15. The apparatus of claim 10, wherein the at least one processor is further configured to:
generate an intermediate 3D microstructure by modifying the initial 3D microstructure based on the 3D gradient;
generate a new 3D gradient based on the intermediate 3D microstructure when the loss value is greater than a predetermined value and modifies the intermediate 3D microstructure based on the new 3D gradient, and
determine the intermediate 3D microstructure as the final 3D microstructure when the loss value is less than the predetermined value.

16. The apparatus of claim 10, wherein the at least one processor is further configured to:
obtain a first gram matrix using the first output feature maps respectively output from at least one layer; and
obtain a second gram matrix using the second output feature maps respectively output from at least one layer,
wherein the loss value is calculated by comparing the first gram matrix with the second gram matrix.

17. The apparatus of claim 10, wherein the neural network comprises a convolution neural network (CNN).

* * * * *